(12) United States Patent
Tian et al.

(10) Patent No.: US 10,807,710 B2
(45) Date of Patent: Oct. 20, 2020

(54) ELECTRICAL CONNECTION STRUCTURE, TAIL ROD QUICK RELEASE STRUCTURE AND UAV HAVING THE SAME

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 370 days.

(21) Appl. No.: 15/975,696

(22) Filed: May 9, 2018

(65) Prior Publication Data

US 2018/0257778 A1 Sep. 13, 2018

(30) Foreign Application Priority Data

May 9, 2017 (CN) .......................... 2017 1 0319393

(51) Int. Cl.
| | |
|---|---|
| *B64C 39/02* | (2006.01) |
| *B64C 1/26* | (2006.01) |
| *B64C 1/30* | (2006.01) |
| *H01R 13/627* | (2006.01) |
| *H01R 13/622* | (2006.01) |
| *H01R 13/635* | (2006.01) |
| *H01R 13/639* | (2006.01) |
| *G02B 6/38* | (2006.01) |

(52) U.S. Cl.
CPC .............. *B64C 39/024* (2013.01); *B64C 1/26* (2013.01); *B64C 1/30* (2013.01); *H01R 13/6276* (2013.01); *B64C 2201/021* (2013.01); *B64C 2201/042* (2013.01); *B64C 2211/00* (2013.01); *B64D 2221/00* (2013.01); *G02B 6/389* (2013.01); *H01R 13/622* (2013.01); *H01R 13/635* (2013.01); *H01R 13/639* (2013.01)

(58) Field of Classification Search
CPC .............. H01R 13/6276; H01R 13/622; H01R 13/639; H01R 13/635; G02B 6/389
See application file for complete search history.

(56) References Cited

U.S. PATENT DOCUMENTS

| | | | | |
|---|---|---|---|---|
| 4,530,559 | A | * | 7/1985 | Burns .................. H01R 13/622 439/319 |
| 4,582,347 | A | * | 4/1986 | Wilcox .................. F16L 29/02 285/12 |
| 5,984,709 | A | * | 11/1999 | Zink .................. H01R 13/6276 439/348 |

(Continued)

*Primary Examiner* — Tho D Ta

(57) ABSTRACT

An electrical connection structure includes a first connection device and a second connection device. The first connection device includes a first outer tube and a first base; multiple rolling parts are disposed in a tube wall of the first outer tube; the second connection device includes a second outer tube, a casing tube and a second base; the second outer tube has a recess on an outer wall thereof; a gap space is provided between the casing tube and the second outer tube; when the first connection device is docked with the second connection device, the first outer tube is inserted into the gap space, the rolling parts are inserted into the recess; the casing tube forces the rolling parts to remain in the recess for locking up the first and second connection devices. A UAV includes a tail rod quick release structure which includes the electrical connection structure.

8 Claims, 3 Drawing Sheets

(56) References Cited

U.S. PATENT DOCUMENTS

| | | | | |
|---|---|---|---|---|
| 5,997,333 | A * | 12/1999 | Konda | H01R 13/6276 |
| | | | | 439/352 |
| 6,062,891 | A * | 5/2000 | Villiers | H01R 13/6276 |
| | | | | 439/348 |
| 6,716,048 | B2 * | 4/2004 | Collin | H01R 13/6276 |
| | | | | 439/317 |
| 7,357,659 | B2 * | 4/2008 | Yoshimori | G02B 6/389 |
| | | | | 285/315 |
| 8,070,090 | B2 * | 12/2011 | Tayman | B64C 39/024 |
| | | | | 244/7 C |
| 8,771,002 | B2 * | 7/2014 | Chiu | H01R 13/6276 |
| | | | | 439/348 |
| 9,502,822 | B1 * | 11/2016 | Huang | H01R 13/6276 |
| 2014/0120761 | A1 * | 5/2014 | Chiu | H01R 13/6276 |
| | | | | 439/359 |
| 2014/0312169 | A1 * | 10/2014 | Fisher | B64C 5/02 |
| | | | | 244/89 |
| 2018/0086458 | A1 * | 3/2018 | Sartorius | B64C 39/024 |

* cited by examiner

ELECTRICAL CONNECTION STRUCTURE, TAIL ROD QUICK RELEASE STRUCTURE AND UAV HAVING THE SAME

CROSS REFERENCE OF RELATED APPLICATION

The present invention claims priority under 35 U.S.C. 119(a-d) to CN 201710319393.6, filed May 9, 2017.

BACKGROUND OF THE PRESENT INVENTION

Field of Invention

The present invention relates to a connection structure, and more particularly to an electrical connection structure, a tail rod quick release structure and a UAV having the same.

Description of Related Arts

UAVs (Unmanned aerial vehicles) can fly in the air for aerial photography, reconnaissance, etc. In some UAVs, the state of flight is controlled by the control of the rudder action of the main wing and the empennage. The empennage is generally mounted on the tail rod. Because the length of the tail rod is relatively long, it is inconvenient during packaging and transportation. Therefore, it is expected that the tail rod can be disassembled or installed when needed. Because the steering gear in the empennage on the tail rod needs to be electrically connected with the main control circuit or the power supply in the fuselage, the current detachable structure is unstable in electrical conductivity, is deviated in control and inconvenient in disassembling and assembling due to the unstable fixed connection. In addition, if the detachable structure of the tail rod is not stable, the instability will be amplified at the terminal of the tail rod, causing the rudder to shake.

SUMMARY OF THE PRESENT INVENTION

A technical problem to be solved is to provide an electrical connection structure, a tail rod quick release structure and a UAV (unmanned aerial vehicle) having the same, which is stable in connection and electrical transmission.

To solve the above technical problem, the present invention provides an electrical connection structure for a UAV (unmanned aerial vehicle), which comprises a first connection device and a second connection device, wherein:

the first connection device comprises a first outer tube and a first base; a first electrical plug part is disposed on the first base; the first outer tube is relatively fixedly sleeved outside the first base; multiple rolling parts, which are movable back and forth along a radial direction of the first outer tube, are respectively disposed in a tube wall of the first outer tube;

the second connection device comprises a second outer tube, a casing tube and a second base; a second electrical plug part for cooperating with the first electrical plug part is disposed on the second base; the second outer tube is relatively fixedly sleeved outside the second base; the second outer tube has a recess on an outer wall thereof; the casing tube is sleeved outside the second outer tube; a gap space is provided between the casing tube and the second outer tube;

when the first connection device is docked with the second connection device, the first outer tube is inserted into the gap space, the recess of the second outer tube reaches a position where the rolling parts are located, the rolling parts move towards an interior of the first outer tube to protrude from an inner wall surface of the first outer tube; a protrusion of the rolling parts, which is defined by protruding from the inner wall surface of the first outer tube, is inserted into the recess of the second outer tube; the casing tube forces the rolling parts to remain in the recess, so that the first connection device and the second connection device are locked.

Preferably, the casing tube is axially movably or rotatably sleeved outside the second outer tube, so that through axially moving or rotating the casing tube, the rolling parts are released.

Preferably, the second connection device further comprises an elastic part which is disposed outside the second outer tube; when an external force against an elastic force of the elastic part is applied to the casing tube, the casing tube is correspondingly driven to axially move or rotate for releasing the rolling parts and stretching out or drawing back the elastic part; the casing tube is reset to an initial position under the elastic force of the elastic part without the external force.

Preferably, when the first connection device is docked with the second connection device, the casing tube is located at the initial position and synchronously moves with the second outer tube; when the recess of the second outer tube reaches the rolling parts, the casing tube just drives the rolling parts to protrude from the inner wall surface of the first outer tube for limiting the second outer tube.

Preferably, an end face of the second outer tube is not aligned with an end face of the casing tube at the initial position, the second outer tube extends outside the casing tube, and the recess of the second outer tube is corresponding to the end face of the casing tube at the initial position.

Preferably, the first outer tube has through-holes on the tube wall for communicating the inner wall surface with the outer wall surface of the first outer tube; the through-holes are large enough to allow the rolling parts to radially move along the first outer tube for switching protruding from two ends of the through-holes, respectively; a size of the through-holes is smaller than a diameter of the rolling parts, so as to limit the rolling parts to move outside the through-holes, respectively.

Preferably, the first outer tube further has an external thread on the outer wall thereof; the casing tube has an internal thread on the inner wall thereof; through the external thread and the internal thread, the casing tube spirally moves towards the first outer tube while keeping the rolling parts in position.

Preferably, a stop block is located between the outer wall of the second outer tube and the inner wall of the casing tube for limiting the casing tube to relatively move or rotate.

Preferably, the first connection device further comprises a first connecting seat which is fixedly connected with the first outer tube for connecting with a first external connection body; the second connection device further comprises a second connecting seat which is fixedly connected with the second outer tube for connecting with a second external connection body.

Also, the present invention provides a tail rod quick release structure for a UAV (unmanned aerial vehicle) which comprises a tail rod base, a tail rod detachable device, a first connection device and a second connection device, wherein:

the tail rod base is fixedly connected with the first connection device or the second connection device, the tail rod detachable device is correspondingly fixedly connected with the second connection device or the first connection device;

the first connection device comprises a first outer tube and a first base; a first electrical plug part is disposed on the first base; the first outer tube is relatively fixedly sleeved outside the first base; multiple rolling parts, which are movable back and forth along a radial direction of the first outer tube, are respectively disposed in a tube wall of the first outer tube;

the second connection device comprises a second outer tube, a casing tube and a second base; a second electrical plug part for cooperating with the first electrical plug part is disposed on the second base; the second outer tube is relatively fixedly sleeved outside the second base; the second outer tube has a recess on an outer wall thereof; the casing tube is sleeved outside the second outer tube; a gap space is provided between the casing tube and the second outer tube;

when the first connection device is docked with the second connection device, the first outer tube is inserted into the gap space, the recess of the second outer tube reaches a position where the rolling parts are located, the rolling parts move towards an interior of the first outer tube to protrude from an inner wall surface of the first outer tube; a protrusion of the rolling parts, which is defined by protruding from the inner wall surface of the first outer tube, is inserted into the recess of the second outer tube; the casing tube forces the rolling parts to remain in the recess, so that the first connection device and the second connection device are locked;

the casing tube is axially movably or rotatably sleeved outside the second outer tube, so that through axially moving or rotating the casing tube, the rolling parts are released, so as to detach the first connection device from the second connection device.

Preferably, the second connection device further comprises an elastic part which is disposed outside the second outer tube; when an external force against an elastic force of the elastic part is applied to the casing tube, the casing tube is correspondingly driven to axially move or rotate for releasing the rolling parts and stretching out or drawing back the elastic part; the casing tube is reset to an initial position under the elastic force of the elastic part without the external force.

Preferably, when the first connection device is docked with the second connection device, the casing tube is located at the initial position and synchronously moves with the second outer tube; when the recess of the second outer tube reaches the rolling parts, the casing tube just drives the rolling parts to protrude from the inner wall surface of the first outer tube for limiting the second outer tube.

Preferably, an end face of the second outer tube is not aligned with an end face of the casing tube at the initial position, the second outer tube extends outside the casing tube, and the recess of the second outer tube is corresponding to the end face of the casing tube at the initial position.

Preferably, the first outer tube has through-holes on the tube wall for communicating the inner wall surface with the outer wall surface of the first outer tube; the through-holes are large enough to allow the rolling parts to radially move along the first outer tube for switching protruding from two ends of the through-holes, respectively; a size of the through-holes is smaller than a diameter of the rolling parts, so as to limit the rolling parts to move outside the through-holes, respectively.

Preferably, the first outer tube further has an external thread on the outer wall thereof; the casing tube has an internal thread on the inner wall thereof; through the external thread and the internal thread, the casing tube spirally moves towards the first outer tube while keeping the rolling parts in position.

Preferably, a stop block is located between the outer wall of the second outer tube and the inner wall of the casing tube for limiting the casing tube to relatively move or rotate.

Preferably, the first connection device further comprises a first connecting seat which is fixedly connected with the first outer tube for connecting with a first external connection body; the second connection device further comprises a second connecting seat which is fixedly connected with the second outer tube for connecting with a second external connection body; the tail rod base is fixedly connected with the first connecting seat or the second connecting seat; the tail rod detachable device is correspondingly fixedly connected with the second seating seat or the first connecting seat.

Preferably, a first circuit is disposed within the tail rod base, the first circuit is welded with the first electrical plug part or the second electrical plug part; a second circuit is disposed within the tail rod detachable device, the second circuit is correspondingly welded with the second electrical plug part or the first electrical plug part.

Furthermore, the present invention also provides a UAV (unmanned aerial vehicle), which comprises any one of the tail rod quick release structures mentioned above.

Based on the technical solutions mentioned above, compared with the prior art, the present invention has beneficial effects as follows.

When the first connection device is docked with the second connection device, the first outer tube is inserted into the gap space between the second outer tube and the casing tube, so that through the rolling parts which are disposed in the tube wall of the first outer tube and radially movable along the first outer tube, under the action of the casing tube, the rolling parts protrude from the inner wall surface of the first outer tube and are inserted into the recess of the second outer wall surface, so as to lock up the second outer tube. At this time, even if pushing hard, the first connection device is unable to be detached from the second connection device, so that the connection is more stable, and the cooperating insertion between the first electrical plug part and the second electrical plug part is also stable, so as to stabilize the electrical transmission, which is very suitable for a system that requires high fixed and electrical stability. Moreover, while being connected, as long as the first connection device is aligned and docked with the second connection device, which is convenient for operation.

Through the electrical connection structure, in the tail rod quick release structure provided by the present invention, the tail rod base and tail rod detachable device are unable to be detached from each other even if pushing hard, so that the connection is very stable. Therefore, the problem of the tail wing, that the small jitter is transmitted to a terminal of the tail rod, does not occur, which ensures the effectiveness of flight control; and simultaneously, the cooperating insertion between the first electrical plug part 13 and the second electrical plug part 24 is also stable to stabilize the electrical transmission without deviation of control signals.

BRIEF DESCRIPTION OF THE DRAWINGS

FIG. 4b is an explosive view of the UAV which shows that a rail rod of the UAV is detached from a fuselage in FIG. 4a.

FIG. 4c is another explosive view of the UAV in FIG. 4a.

Figure 1A:
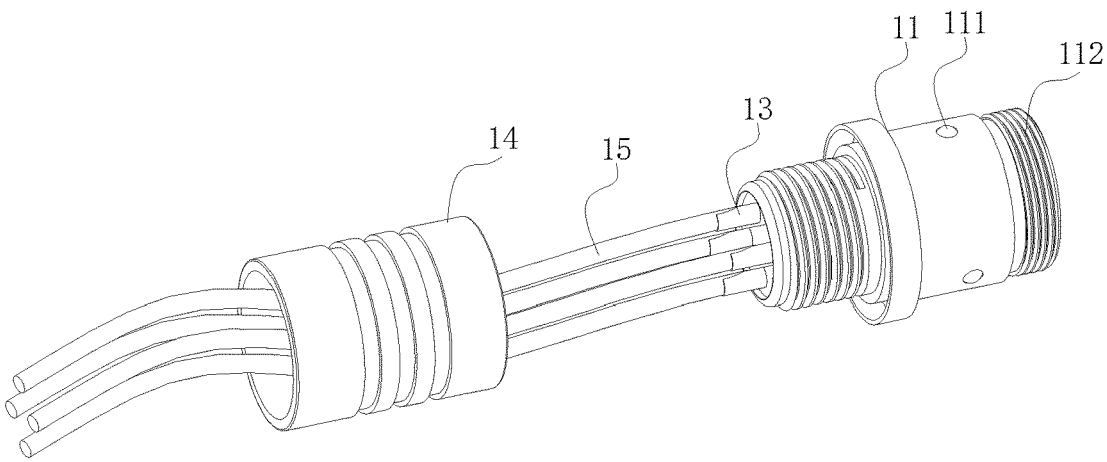
FIG. 1a is an explosive view of a first connection device provided by the present invention.

In the drawings, 1: first connection device; 2: second connection device; 3: tail rod base; 4: tail rod detachable device; 5: fuselage; 11: first outer tube; 12: first base; 13: first electrical plug part; 14: first connecting seat; 15: first circuit; 11: rolling part; 112: external thread; 21: second outer tube; 22: casing tube; 23: second base; 24: second electrical plug part; 25: elastic part; 26: second connecting seat; 27: gasket; 28: second circuit; 211: recess; 212: limit slot; 213: stop block; 221: internal thread; 111a: a position where the rolling part protrudes from an outer wall surface of the first outer tube; 111b: a position where the rolling part protrudes from an inner wall surface of the first outer tube; 110: through-hole.

DETAILED DESCRIPTION OF THE PREFERRED EMBODIMENT

In order to make the above objects, features, and advantages of the present invention more obvious and understandable, the specific embodiments of the present invention will be described in detail with accompanying drawings as follows.

In the following description, a lot of specific details are set forth to provide a thorough understanding of the present invention. However, the present invention is able to be implemented in many other manners different from those described herein, and those skilled in the art are able to perform similar promotions without departing from the essence of the present invention. Therefore, the present invention is not limited by the embodiments disclosed below.

Referring to FIGS. 1a to 4c, an electrical connection structure for a UAV (unmanned aerial vehicle) according to a preferred embodiment of the present invention is illustrated, which comprises a first connection device 1 and a second connection device 2, wherein the first connection device 1 and the second connection device 2 are both electrically and mechanically connected with each other.

Figure 2:
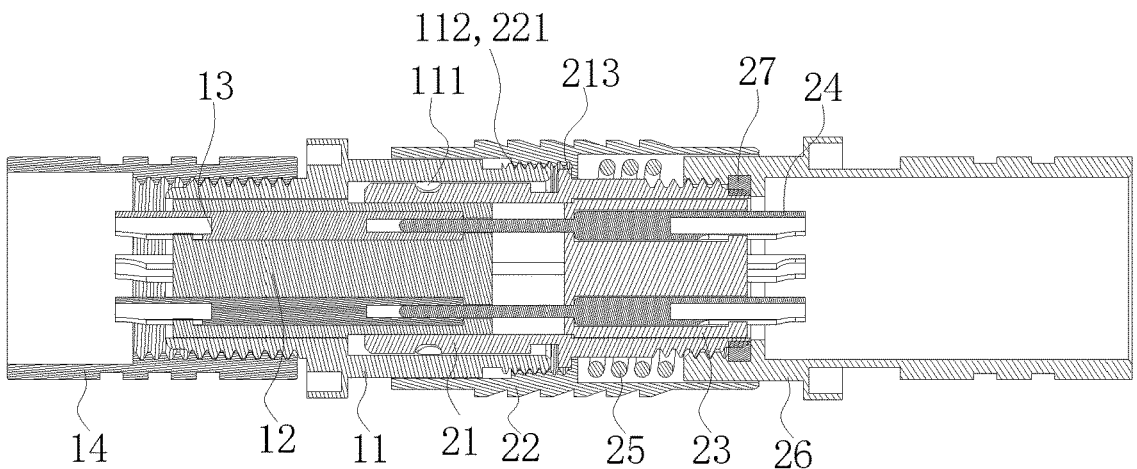
FIG. 2 is a sectional view of an electrical connection structure provided by the present invention.

As shown in FIGS. 1a and 2, the first connection device 1 comprises a first outer tube 11 and a first base 12, wherein a first electrical plug part 13 is disposed on the first base 12 which is not limited in shape and adapted for fixing the first electrical plug part 13; the first electrical plug part 13 is a pluggable conductive part, and preferably, is a contact pin which is inserted through the first base 12; the first outer tube 11 is relatively fixedly sleeved outside the first base 12; the first outer tube 11 and the first base 12 are fixed by glue or in other ways. It should be understood that since the first outer tube 11 is inserted into a gap space mentioned later, another gap space or large space is correspondingly provided between the first outer tube 11 and the first base 12, so that a connection between the first connection device 1 and the second connection device 2 is not affected. Moreover, multiple rolling parts 111, which are movable back and forth along a radial direction of the first outer tube 11, are respectively disposed in a tube wall of the first outer tube 11. According to the preferred embodiment, the rolling parts 111 are balls.

Figure 1B:
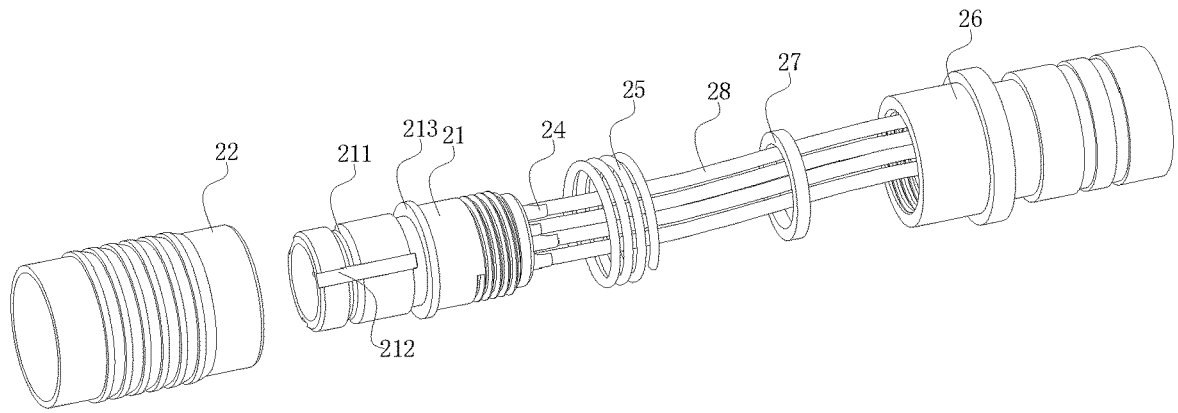
FIG. 1b is an explosive view of a second connection device provided by the present invention.

As shown in FIGS. 1b and 2, the second connection device 2 comprises a second outer tube 21, a casing tube 22 and a second base 23, wherein a second electrical plug part 24 for cooperating with the first electrical plug part 13 is disposed on the second base 23 which is not limited in shape and adapted for fixing the second electrical plug part 24; the second electrical plug part 24 is a pluggable conductive part, and preferably, is a contact pin which is inserted through the second base 23; the second electrical plug part 24 and the first electrical plug part 13 are respectively a male pin and a female pin; the second outer tube 21 is relatively fixedly sleeved outside the second base 23; the second outer tube 21 and the second base 23 are fixed by glue or in other ways; the second outer tube 21 has a recess 211 on an outer wall thereof for cooperating with the rolling parts 111 to limit a movement of the rolling parts 111; the casing tube 22 is sleeved outside the second outer tube 21, the gap space is provided between the casing tube 22 and the second outer tube 21 for allowing the first outer tube 11 to be inserted therein.

As shown in FIGS. 1a, 1b and 2, when the first connection device 1 is docked with the second connection device 2, the first outer tube 11 is inserted into the gap space, the recess 211 of the second outer tube 21 reaches a position where the rolling parts 111 are located, the rolling parts 111 move towards an interior of the first outer tube 11 to protrude from an inner wall surface of the first outer tube 11 (since the recess 211 gives way to the rolling parts 111, the rolling parts 111 freely enter the recess 211); a protrusion of the rolling parts 111, which is defined by protruding from the inner wall surface of the first outer tube 11, is inserted into the recess 211 of the second outer tube 21; the casing tube 22 forces the rolling parts 111 to remain in the recess 211. Therefore, the first connection device 1 and the second connection device 2 are locked.

In other words, when the first connection device 1 is docked with the second connection device 2, the first outer tube 11 relatively moves to both the second outer tube 21 and the casing tube 22, the first outer tube 11 gradually moves into the gap space which is provided between the second outer tube 21 and the casing tube 22; when the recess 211 of the second outer tube 21 reaches the position where the rolling parts 111 are located, the rolling parts 111 move towards the interior of the first outer tube 11 to protrude from the inner wall surface of the first outer tube 11, the protrusion of the rolling parts 111, which is defined by protruding from the inner wall surface of the first outer tube 11, is inserted into the recess 211 of the second outer tube 21; at this time, it seems that the second outer tube 21 is limited, and however, if a relative movement between the second outer tube 21 and the first outer tube 11 occurs, the rolling parts 111 will be forced to roll out of the recess 211, so through the casing tube 22, the rolling parts 111 are forced to remain the protrusion thereof in the recess 211, so as to limit the relative movement of the second outer tube 21, thus the first connection device 1 and the second connection device 2 are locked. Of course, at this time, the first electrical plug part 13 and the second electrical plug part 24 are cooperated with each other to achieve electrical conduction.

When the first connection device 1 is docked with the second connection device 2, the first outer tube 11 is inserted into the gap space which is provided between the second outer tube 21 and the casing tube 22. As a result, under an action of the casing tube 22, the rolling parts 111 which are disposed in the wall tube of the first outer tube 11 and are movable along the radial direction of the first outer tube 11, are forced to protrude from the inner wall surface of the first outer tube 11 and remain the protrusion thereof in the recess 211 of the second outer tube 21, so as to lock the second outer tube 21; at this time, even if pulling hard, it is impossible to detach the first connection device 1 from the second connection device 2. Therefore, the connection between the first connection device 1 and the second connection device 2 is stable, so that an electrical transmission therebetween is also stable, which is very suitable for a system that requires high fixed and electrical stability. Moreover, while being connected, as long as the first connection device 1 is aligned and docked with the second connection device 2, which is convenient for operation.

According to the preferred embodiment of the present invention, the casing tube 22 is able to be fixed to the second outer tube 21, so that the first connection device 1 and the second connection device 2 are locked and fixed, which is able to achieve more stable connection and stable electrical transmission; or, when the casing tube 22 is able to move relatively to the second outer tube 21, then just through removing the casing tube 22, the rolling parts 111 are no longer forced by the casing tube 22, the second outer tube 21 is correspondingly no longer limited, and therefore, on the basis of achieving more stable connection and stable electrical transmission, it is also possible to achieve detachability between the first connection device 1 and the second connection device 2.

When axially moving along or being rotatably sleeved outside the second outer tube 21, the casing tube 22 releases the rolling parts 111 through the axial movement or the rotation, respectively. Since the casing tube 22 is able to axially move or axially rotate relatively to the second outer tube 21, the rolling parts 111 are released just through removing the casing tube 22 or turning away the rolling parts 111, so as to detach the first connection device 1 from the second connection device 2 for achieving disassembly. In addition, the first connection device 1 and the second connection device 2 are quickly disassembled by hand, and no tools are needed, which is very convenient.

Take the casing tube 22 is rotatably movably sleeved outside the second outer tube 21 as an example. When the casing tube 22 moves towards the first outer tube 11 (it may be that when the first outer tube 11 is inserted into the gap space provided between the second outer tube 21 and the casing tube 22, the relative movement of the casing tube 22 achieves the force applied to the rolling parts 111, it also may be that after the first outer tube 11 is inserted into the gap space, the casing tube 22 moves alone to the position where the rolling parts 111 are located for applying the force to the rolling parts 111), the casing tube 22 forces the rolling parts 111 to protrude from the inner wall surface of the first outer tube 11, the protrusion of the rolling parts 111 is inserted into the recess 211 of the second outer tube 21. When the casing tube 22 moves away from the first outer tube 11, the rolling parts 111 are released, so that the casing tube 22 moves out and forces the rolling parts 111 to go outside the recess 211 and protrude from the outer wall surface of the first outer tube 11. Of course, when the rolling parts 111 are rotatably removed, the principle is as same as the description mentioned above, which will not be repeated here.

As shown in FIGS. 1a, 1b and 2, the recess 211 is preferably embodied as a circular groove provided on the outer wall of the second outer tube 21, a width of the circular groove matches with a diameter of the rolling parts 111; there are a circle of several rolling parts 111 are arranged in the tube wall of the first outer tube 11 to achieve uniform and stable connection. Since the recess 211 is the circular groove, a limit block is disposed on the outer wall of the first outer tube 11 to prevent the first connection device 1 and the second connection device 2 from rotating; the second outer tube 21 has a limit slot 212 on an outer wall thereof which is corresponding to the limit block, so as to limit the rotation between the first outer tube 11 and the second outer tube 21 after ducking; limit slot 212 is also able to serve as a guideway slot to guide the relative movement between the first outer tube 11 and the second outer tube 21. It should be understood that both the recess 211 and the rolling parts 111 are not limited to the description above, the recess 211 is embodied as dotted pits, one dot pit is corresponding to one rolling part 111, so that no limit structure is needed.

As shown in FIGS. 1b and 2, the second connection device 2 further comprises an elastic part 25 which is disposed outside the second outer tube 21. When an external force against an elastic force of the elastic part 25 is applied to the casing tube 22, the casing tube 22 is correspondingly driven to axially move or rotate for releasing the rolling parts 111, and stretching out or drawing back the elastic part 25 (if the casing tube 22 moves back towards one side of the second connection device 2, the elastic part 25 is compressed; if the casing tube 22 rotates, the elastic part 25 is compressed or stretched). The casing tube 22 is reset to an initial position under the elastic force of the elastic part 25 without the external force, and the initial position is defined as a position of the second outer tube 21 where the casing tube 22 is able to maintain pressing the rolling parts 111 when the first connection device 1 and the second connection device 2 are locked.

The elastic part 25 is able to be a spring, and also able to be other elastic components, as long as it has a certain degree of flexibility. When the casing tube 22 is axially movably sleeved outside the second outer tube 21, the elastic part 25 is sleeved outside the second outer tube 21 and is located at one side of the casing tube 22 away from the second connection device 2. When a force is applied to the casing tube 22, the casing tube 22 moves back to compress the elastic part 25; when no force is applied to the casing tube 22, the elastic part 25 is reset for driving the casing tube 22 to be reset to the initial position. When the casing tube 22 is rotatably sleeved outside the second outer tube 21, the elastic part 25 is circumferentially disposed along the outer wall of the second outer tube 21; when a force is applied to the casing tube 22, the casing tube 22 rotates to compress or stretch the elastic part 25; when no force is applied to the casing tube 22, the elastic part 25 is reset for driving the casing tube 22 to be reset to the initial position.

It can be seen that through the elastic force of the elastic part 25, the casing tube 22 is able to be automatically reset to the initial position after being removed without manual reset; and meanwhile, it is ensured that the position of the casing tube 22 is the same for each use, so that the accuracy is high, the operation for the user is convenient, the reset is also not omitted, thereby avoiding unlocking the first connection device 1 and the second connection device 2. In addition, due to the elastic force of the elastic part 25, the casing tube 22 is unable to move or rotate without the external force, so that the elastic part 25 maintains the compression state without fixing the casing tube 22, which is more convenient.

Preferably, when the first connection device 1 is docked with the second connection device 2, the casing tube 22 is located at the initial position and synchronously moves with the second outer tube 21, that is to say, that when the first outer tube 11 is inserted into the gap space between the second outer tube 21 and the casing tube 22, no relative movement occurs therebetween, and the casing tube 22 maintains at the initial position. During the docking of the first connection device 1 and the second connection device 2, when the recess 211 of the second outer tube 21 reaches the rolling parts 111, the casing tube 22 just drives the rolling parts 111 to protrude from the inner wall surface of the first outer tube 11 for limiting the second outer tube 21. The user only needs to perform a single insertion to complete the locking between the first connection device 1 and the second connection device 2 without pushing the casing tube 22 to an oppressed position after the insertion.

When the first outer tube 11 is inserted into the gap space, the casing tube 22 maintains at the initial position for driving the rolling parts 111 to protrude from the inner wall surface of the first outer tube 11, the protrusion of the rolling parts 111 is inserted into the recess 211 of the second outer tube 21 without follow-up manual movement. The casing tube 22 moves away from the second outer tube 21 to leave the initial position, so as to release the rolling parts 111, so that the second outer tube 21 is able to move relatively to the first outer tube 11.

As shown in FIG. 2, an end face of the second outer tube 21 is not aligned with an end face of the casing tube 22 at the initial position, the second outer tube 21 extends outside the casing tube 22, and the recess 211 of the second outer tube 21 is corresponding to the end face of the casing tube 22 at the initial position. During the process of inserting the first outer tube 11 into the gap space, the second outer tube 21 firstly reaches the rolling parts 111 for driving the rolling parts 111 to move outwardly to protrude from the outer wall surface of the first outer tube 11; when the recess 211 of the second outer tube 21 reaches the rolling parts 111, the casing tube 22 just reaches the rolling parts 111 for driving the rolling parts 111 to move inwardly to protrude from the inner wall surface of the first outer tube 11, so that the protrusion is just inserted into the recess 211, thus the engagement of the recess 211 and the rolling parts 111, and the action of the casing tube 22 applying to the rolling parts 111 are synchronously achieved, and the problem that the rolling parts 111 are locked by the second outer tube 21 and the casing tube 22 does not occur.

Figure 3:
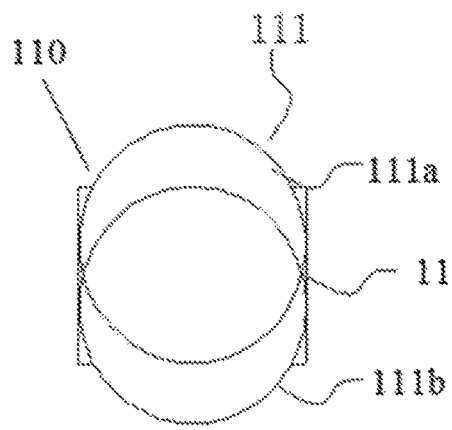
FIG. 3 shows that rolling parts respectively cooperate with through-holes provided by the present invention.

As shown in FIGS. 1a, 2 and 3, the first outer tube 11 has through-holes 110 on the tube wall for communicating the inner wall surface with the outer wall surface of the first outer tube 11. The through-holes 110 are large enough to allow the rolling parts 111 to radially move along the first outer tube 11 for switching protruding from two ends of the through-holes 110, respectively; that is to say, that the rolling parts 111 are able to respectively radially move in the through-holes 110 to protrude from a first end of the through-holes 110 (which is corresponding to a position 111a where the rolling parts 111 protrude from the outer wall surface of the first outer tube 11), and also able to respectively radially move in the through-holes 110 to protrude from a second end of the through-holes 110 (which is corresponding to a position 111b where the rolling parts 111 protrude from the inner wall surface of the first outer tube 11). A size of the through-holes 110 is smaller than a diameter of the rolling parts 111, so as to limit the rolling parts 111 to move outside the through-holes 110, respectively. Of course, the through-holes 110 are large enough to allow the rolling parts 111 to protrude from the through-holes 110 and simultaneously to limit the second outer tube 21. FIG. 3 is a structurally schematic view, which shows one rolling part 111 protrudes from the outer wall surface or the inner wall surface of the first outer tube 11, which is able to be correspondingly changed, optimized or modified as required.

As shown in FIGS. 1a, 1b and 2, the first outer tube 11 further has an external thread 112 on the outer wall thereof, and the casing tube 22 has an internal thread 221 on the inner wall thereof. Through the external thread 112 and the internal thread 221, the casing tube 22 is able to spirally move towards the first outer tube 11 while keeping the rolling parts 111 in position. After the first connection device 1 and the second connection device 2 are locked, the casing tube 22 is further fixed with the first outer tube 11 in a threaded connection manner, so as to further stabilize the locking between the first connection device 1 and the second connection device 2, and to prevent the user from inadvertently unlocking the first connection device 1 and the second connection device 2 caused by accidentally moving the casing tube 22.

As shown in FIGS. 1b and 2, a stop block 213 is located between the outer wall of the second outer tube 21 and the inner wall of the casing tube 22 for limiting the casing tube 22 to relatively move or rotate, so as to avoid the casing tube 22 from moving outside the second outer tube 21 or outside the range. The stop block 213 is embodied as a retaining ring, and a corresponding convex ring is disposed on the casing tube 22 to cooperate with the retaining ring for achieving the limiting. The stop block 213 is able to be other structures which are not limited.

As shown in FIGS. 1a, 1b and 2, the first connection device 1 further comprises a first connecting seat 14 which is fixedly connected with the first outer tube 11 for connecting with a first external connection body; the second connection device 2 further comprises a second connecting seat 26 which is fixedly connected with the second outer tube 21 for connecting with a second external connection body. The first connecting seat 14 and the first outer tube 11, the second connecting seat 26 and the second outer tube 21 are fixed through the threaded and bonding connection manner, and of course or other connection manners. The elastic part 25 faces against the second connecting seat 26. A gasket 27 is located between the second connecting seat 26 and the second outer tube 21 for vibration reduction while resetting the elastic part 25.

Figure 4A:
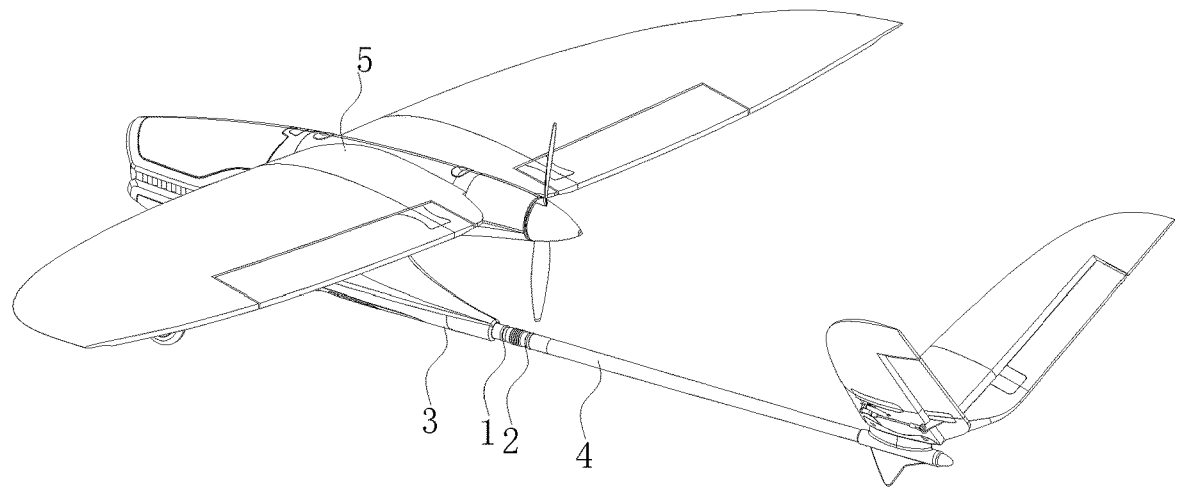
FIG. 4a is a structurally schematic view of a UAV (unmanned aerial vehicle) provided by the present invention.
Figure 4B:
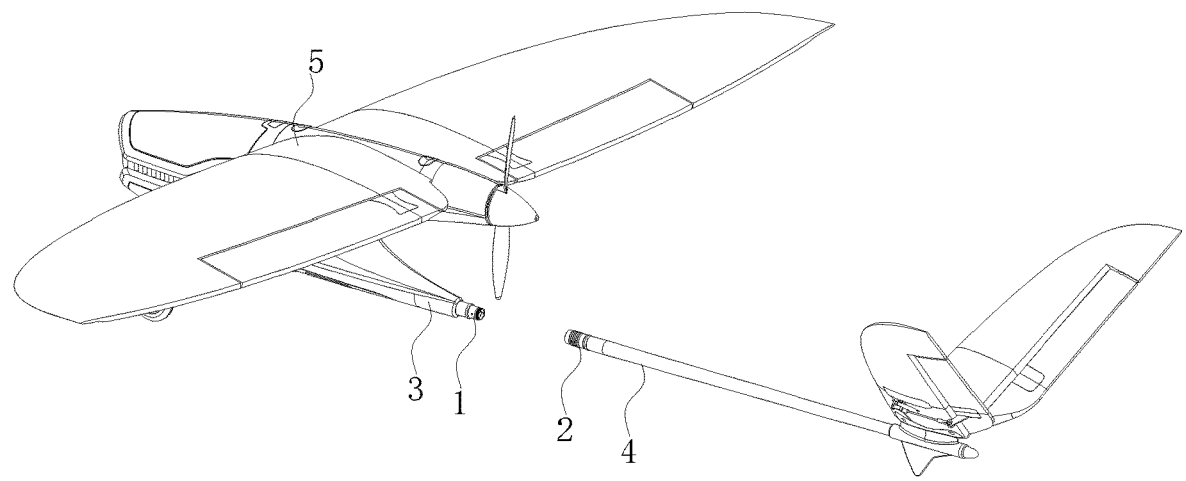
Figure 4C:
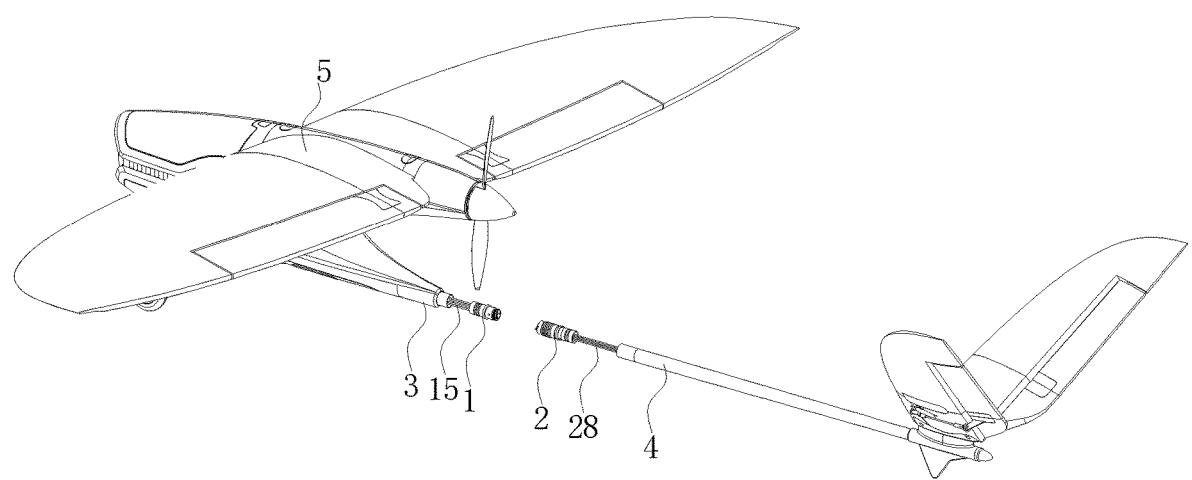

Referring to FIGS. 1a to 4c, a tail rod quick release structure for a UAV (unmanned aerial vehicle) according to a preferred embodiment of the present invention is illustrated, which comprises a tail rod base 3, a tail rod detachable device 4, a first connection device 1 and a second connection device 2, wherein the tail rod base 3 is fixedly connected with the first connection device 1 or the second connection device 2, the tail rod detachable device 4 is correspondingly fixedly connected with the second connection device 2 or the first connection device 1. As shown in FIGS. 4a to 4c, the tail rod base 3 is fixedly connected with the first connection device 1, and the tail rod detachable device 4 is correspondingly fixedly connected with the second connection device 2.

The first connection device 1 comprises a first outer tube 11 and a first base 12, wherein a first electrical plug part 13 is disposed on the first base 12; the first outer tube 11 is relatively fixedly sleeved outside the first base 12; multiple rolling parts 111, which are movable back and forth along a radial direction of the first outer tube 11, are respectively disposed in a tube wall of the first outer tube 11.

The second connection device 2 comprises a second outer tube 21, a casing tube 22 and a second base 23, wherein a second electrical plug part 24 for cooperating with the first electrical plug part 13 is disposed on the second base 23; the second outer tube 21 is relatively fixedly sleeved outside the second base 23; the second outer tube 21 has a recess 211 on an outer wall thereof for cooperating with the rolling parts 111 to limit a movement of the rolling parts 111; the casing tube 22 is sleeved outside the second outer tube 21; a gap space is provided between the casing tube 22 and the second outer tube 21 for allowing the first outer tube 11 to be inserted therein.

when the first connection device 1 is docked with the second connection device 2, the first outer tube 11 is inserted into the gap space, the recess 211 of the second outer tube 21 reaches a position where the rolling parts 111 are located, the rolling parts 111 move towards an interior of the first outer tube 11 to protrude from an inner wall surface of the first outer tube 11; a protrusion of the rolling parts 111, which is defined by protruding from the inner wall surface of the first outer tube 11, is inserted into the recess 211 of the second outer tube 21; the casing tube 22 forces the rolling parts 111 to remain in the recess 211. Therefore, the first connection device 1 and the second connection device 2 are locked.

The casing tube 22 is able to be axially movably or rotatably sleeved outside the second outer tube 21, so that through axially moving or rotating the casing tube 22, the rolling parts 111 are released, so as to detach the first connection device 1 from the second connection device 2.

In the tail rod quick release structure provided by the present invention, the tail rod base 3 and tail rod detachable device 4 are unable to be detached from each other even if pushing hard, so that the connection is very stable. Therefore, the problem of the tail wing, that the small jitter is transmitted to a terminal of the tail rod, does not occur, which ensures the effectiveness of flight control; and simultaneously, the cooperating insertion between the first electrical plug part 13 and the second electrical plug part 24 is also stable to stabilize the electrical transmission without deviation of control signals.

Since the casing tube 22 is able to axially move or rotate relatively to the second outer tube 21, the rolling parts 111 are released just through removing the casing tube 22 or turning away the rolling parts 111, so as to detach the first connection device 1 from the second connection device 2 for achieving disassembly. In addition, the first connection device 1 and the second connection device 2 are quickly disassembled by hand, and no tools are needed, which is very convenient.

The second connection device 2 further comprises an elastic part 25 which is disposed outside the second outer tube 21. When an external force against an elastic force of the elastic part 25 is applied to the casing tube 22, the casing tube 22 is correspondingly driven to axially move or rotate for releasing the rolling parts 111, and stretching out or drawing back the elastic part 25. The casing tube 22 is reset to an initial position under the elastic force of the elastic part 25 without the external force.

When the first connection device 1 is docked with the second connection device 2, the casing tube 22 is located at the initial position and synchronously moves with the second outer tube 21; when the recess 211 of the second outer tube 21 reaches the rolling parts 111, the casing tube 22 just drives the rolling parts 111 to protrude from the inner wall surface of the first outer tube 11 for limiting the second outer tube 21.

An end face of the second outer tube 21 is not aligned with an end face of the casing tube 22 at the initial position, the second outer tube 21 extends outside the casing tube 22, and the recess 211 of the second outer tube 21 is corresponding to the end face of the casing tube 22 at the initial position.

The first outer tube 11 has through-holes 110 on the tube wall for communicating the inner wall surface with the outer wall surface of the first outer tube 11. The through-holes 110 are large enough to allow the rolling parts 111 to radially move along the first outer tube 11 for switching protruding from two ends of the through-holes 110, respectively. A size of the through-holes 110 is smaller than a diameter of the rolling parts 111, so as to limit the rolling parts 111 to move outside the through-holes 110, respectively.

The first outer tube 11 further has an external thread 112 on the outer wall thereof, and the casing tube 22 has an internal thread 221 on the inner wall thereof. Through the external thread 112 and the internal thread 221, the casing tube 22 is able to spirally move towards the first outer tube 11 while keeping the rolling parts 111 in position.

A stop block 213 is located between the outer wall of the second outer tube 21 and the inner wall of the casing tube 22 for limiting the casing tube 22 to relatively move or rotate.

The first connection device 1 further comprises a first connecting seat 14 which is fixedly connected with the first outer tube 11 for connecting with a first external connection body; the second connection device 2 further comprises a second connecting seat 26 which is fixedly connected with the second outer tube 21 for connecting with a second external connection body. The tail rod base 3 is connected with the first connecting seat 14 or the second connecting seat 26, and the tail detachable device 4 is connected with the second connecting seat 26 or the first connecting seat 14.

The tail rod quick release structure provided by the present invention is able to refer to the specific description of the electrical connection structure mentioned above. The same content is not repeated here.

Referring to FIG. 4c, a first circuit 15 is disposed within the tail rod base 3, the first circuit 15 is welded with the first electrical plug part 13 or the second electrical plug part 24; a second circuit 28 is disposed within the tail rod detachable device 4, the second circuit 28 is correspondingly welded with the second electrical plug part 24 or the first electrical plug part 13. Through the first circuit 15 disposed within the tail rod base 3, and the second circuit 28 disposed within the tail rod detachable device 4, the tail rod is sufficiently utilized to protect and normalize the circuits.

Referring to FIGS. 4a to 4c, a UAV (unmanned aerial vehicle) according to a preferred embodiment of the present invention is illustrated, which comprises the tail rod quick release structure mentioned above, wherein the tail rod base 3 is disposed on a fuselage 5, the tail rod detachable device 4 is quickly detached from the tail rod base 3 through the electrical connection structure mentioned above, which is able to be seen from the description mentioned above.

Although the present invention is disclosed in the preferred embodiments as above, it is not intended to limit the claims, and those skilled in the art is able to make possible changes and modifications without departing from the spirit and scope of the present invention. Therefore, the protection scope of the present invention shall be subject to the scope defined by the claims of the present invention.

What is claimed is:

1. An electrical connection structure for a UAV (unmanned aerial vehicle), which comprises a first connection device and a second connection device, wherein:
the first connection device comprises a first outer tube and a first base; a first electrical plug part is disposed on the first base; the first outer tube is relatively fixedly sleeved outside the first base; multiple rolling parts, which are movable back and forth along a radial direction of the first outer tube, are respectively disposed in a tube wall of the first outer tube;

the second connection device comprises a second outer tube, a casing tube and a second base; a second electrical plug part for cooperating with the first electrical plug part is disposed on the second base; the second outer tube is relatively fixedly sleeved outside the second base; the second outer tube has a recess on an outer wall thereof; the casing tube is sleeved outside the second outer tube; a gap space is provided between the casing tube and the second outer tube;

when the first connection device is docked with the second connection device, the first outer tube is inserted into the gap space, the recess of the second outer tube reaches a position where the rolling parts are located, the rolling parts move towards an interior of the first outer tube to protrude from an inner wall surface of the first outer tube; a protrusion of the rolling parts, which is defined by protruding from the inner wall surface of the first outer tube, is inserted into the recess of the second outer tube; the casing tube forces the rolling parts to remain in the recess, so that the first connection device and the second connection device are locked;

the casing tube is axially movably or rotatably sleeved outside the second outer tube, so that through axially moving or rotating the casing tube, the rolling parts are released;

the second connection device further comprises an elastic part which is disposed outside the second outer tube; when an external force against an elastic force of the elastic part is applied to the casing tube, the casing tube is correspondingly driven to axially move or rotate for releasing the rolling parts and stretching out or drawing back the elastic part; the casing tube is reset to an initial position under the elastic force of the elastic part without the external force;

when the first connection device is docked with the second connection device, the casing tube is located at the initial position and synchronously moves with the second outer tube; when the recess of the second outer tube reaches the rolling parts, the casing tube just drives the rolling parts to protrude from the inner wall surface of the first outer tube for limiting the second outer tube;

an end face of the second outer tube is not aligned with an end face of the casing tube at the initial position, the second outer tube extends outside the casing tube;

the first outer tube has through-holes on the tube wall for communicating the inner wall surface with the outer wall surface of the first outer tube; the through-holes are large enough to allow the rolling parts to radially move along the first outer tube for switching protruding from two ends of the through-holes, respectively; a size of the through-holes is smaller than a diameter of the rolling parts, so as to limit the rolling parts to move outside the through-holes, respectively;

the first outer tube further has an external thread on the outer wall thereof; the casing tube has an internal thread on the inner wall thereof; through the external thread and the internal thread, the casing tube spirally moves towards the first outer tube while keeping the rolling parts in position.

2. The electrical connection structure, as recited in claim 1, wherein a stop block is located between the outer wall of the second outer tube and the inner wall of the casing tube for limiting the casing tube to relatively move or rotate.

3. The electrical connection structure, as recited in claim 2, wherein the first connection device further comprises a first connecting seat which is fixedly connected with the first outer tube for connecting with a first external connection body; the second connection device further comprises a second connecting seat which is fixedly connected with the second outer tube for connecting with a second external connection body.

4. A tail rod release structure for a UAV (unmanned aerial vehicle), which comprises a tail rod base, a tail rod detachable device, a first connection device and a second connection device, wherein:

the tail rod base is fixedly connected with the first connection device or the second connection device, the tail rod detachable device is correspondingly fixedly connected with the second connection device or the first connection device;

the first connection device comprises a first outer tube and a first base; a first electrical plug part is disposed on the first base; the first outer tube is relatively fixedly sleeved outside the first base; multiple rolling parts, which are movable back and forth along a radial direction of the first outer tube, are respectively disposed in a tube wall of the first outer tube;

the second connection device comprises a second outer tube, a casing tube and a second base; a second electrical plug part for cooperating with the first electrical plug part is disposed on the second base; the second outer tube is relatively fixedly sleeved outside the second base; the second outer tube has a recess on an outer wall thereof; the casing tube is sleeved outside the second outer tube; a gap space is provided between the casing tube and the second outer tube;

when the first connection device is docked with the second connection device, the first outer tube is inserted into the gap space, the recess of the second outer tube reaches a position where the rolling parts are located, the rolling parts move towards an interior of the first outer tube to protrude from an inner wall surface of the first outer tube; a protrusion of the rolling parts, which is defined by protruding from the inner wall surface of the first outer tube, is inserted into the recess of the second outer tube; the casing tube forces the rolling parts to remain in the recess, so that the first connection device and the second connection device are locked;

the casing tube is axially movably or rotatably sleeved outside the second outer tube, so that through axially moving or rotating the casing tube, the rolling parts are released, so as to detach the first connection device from the second connection device;

the second connection device further comprises an elastic part which is disposed outside the second outer tube; when an external force against an elastic force of the elastic part is applied to the casing tube, the casing tube is correspondingly driven to axially move or rotate for releasing the rolling parts and stretching out or drawing back the elastic part; the casing tube is reset to an initial position under the elastic force of the elastic part without the external force;

when the first connection device is docked with the second connection device, the casing tube is located at the initial position and synchronously moves with the second outer tube; when the recess of the second outer tube reaches the rolling parts, the casing tube just drives the rolling parts to protrude from the inner wall surface of the first outer tube for limiting the second outer tube;

an end face of the second outer tube is not aligned with an end face of the casing tube at the initial position, the second outer tube extends outside the casing tube;

the first outer tube has through-holes on the tube wall for communicating the inner wall surface with the outer wall surface of the first outer tube; the through-holes are large enough to allow the rolling parts to radially move along the first outer tube for switching protruding from two ends of the through-holes, respectively; a size of the through-holes is smaller than a diameter of the rolling parts, so as to limit the rolling parts to move outside the through-holes, respectively;

the first outer tube further has an external thread on the wall thereof; the casing tube has an internal thread on the inner wall thereof; through the external thread and the internal thread, the casing tube spirally moves towards the first outer tube while keeping the rolling parts in position.

5. The tail rod release structure, as recited in claim 4, wherein a stop block is located between the outer wall of the second outer tube and the inner wall of the casing tube for limiting the casing tube to relatively move or rotate.

6. The tail rod release structure, as recited in claim 5, wherein the first connection device further comprises a first connecting seat which is fixedly connected with the first outer tube for connecting with a first external connection body; the second connection device further comprises a second connecting seat which is fixedly connected with the second outer tube for connecting with a second external connection body; the tail rod base is fixedly connected with the first connecting seat or the second connecting seat; the tail rod detachable device is correspondingly fixedly connected with the second seating seat or the first connecting seat.

7. The tail rod release structure, as recited in claim 6, wherein a first circuit is disposed within the tail rod base, the first circuit is welded with the first electrical plug part or the second electrical plug part; a second circuit is disposed within the tail rod detachable device, the second circuit is correspondingly welded with the second electrical plug part or the first electrical plug part.

8. A UAV (unmanned aerial vehicle), which comprises a tail rod release structure and a fuselage, wherein the tail rod release structure is connected with the fuselage;

the tail rod release structure comprises a tail rod base, a tail rod detachable device, a first connection device and a second connection device, wherein:

the tail rod base is fixedly connected with the first connection device or the second connection device, the tail rod detachable device is correspondingly fixedly connected with the second connection device or the first connection device;

the first connection device comprises a first outer tube and a first base; a first electrical plug part is disposed on the first base; the first outer tube is relatively fixedly sleeved outside the first base; multiple rolling parts, which are movable back and forth along a radial direction of the first outer tube, are respectively disposed in a tube wall of the first outer tube;

the second connection device comprises a second outer tube, a casing tube and a second base; a second electrical plug part for cooperating with the first electrical plug part is disposed on the second base; the second outer tube is relatively fixedly sleeved outside the second base; the second outer tube has a recess on an outer wall thereof; the casing tube is sleeved outside the second outer tube; a gap space is provided between the casing tube and the second outer tube;

when the first connection device is docked with the second connection device, the first outer tube is inserted into the gap space, the recess of the second outer tube reaches a position where the rolling parts are located, the rolling parts move towards an interior of the first outer tube to protrude from an inner wall surface of the first outer tube; a protrusion of the rolling parts, which is defined by protruding from the inner wall surface of the first outer tube, is inserted into the recess of the second outer tube; the casing tube forces the rolling parts to remain in the recess, so that the first connection device and the second connection device are locked;

the casing tube is axially movably or rotatably sleeved outside the second outer tube, so that through axially moving or rotating the casing tube, the rolling parts are released, so as to detach the first connection device from the second connection device;

the second connection device further comprises an elastic part which is disposed outside the second outer tube; when an external force against an elastic force of the elastic part is applied to the casing tube, the casing tube is correspondingly driven to axially move or rotate for releasing the rolling parts and stretching out or drawing back the elastic part; the casing tube is reset to an initial position under the elastic force of the elastic part without the external force;

when the first connection device is docked with the second connection device, the casing tube is located at the initial position and synchronously moves with the second outer tube; when the recess of the second outer tube reaches the rolling parts, the casing tube just drives the rolling parts to protrude from the inner wall surface of the first outer tube for limiting the second outer tube;

an end face of the second outer tube is not aligned with an end face of the casing tube at the initial position, the second outer tube extends outside the casing tube;

the first outer tube has through-holes on the tube wall for communicating the inner wall surface with the outer wall surface of the first outer tube; the through-holes are large enough to allow the rolling parts to radially move along the first outer tube for switching protruding from two ends of the through-holes, respectively; a size of the through-holes is smaller than a diameter of the rolling parts, so as to limit the rolling parts to move outside the through-holes, respectively;

the first outer tube further has an external thread on the outer wall thereof; the casing tube has an internal thread on the inner wall thereof; through the external thread and the internal thread, the casing tube spirally moves towards the first outer tube while keeping the rolling parts in position.

\* \* \* \* \*